Feb. 19, 1952   R. STADELMANN   2,586,107
INFINITELY VARIABLE-GEAR FOR DRIVING GUN MOUNTS
Filed July 6, 1949   3 Sheets-Sheet 1

INVENTOR
RUDOLF STADELMANN

Feb. 19, 1952 R. STADELMANN 2,586,107
INFINITELY VARIABLE-GEAR FOR DRIVING GUN MOUNTS
Filed July 6, 1949 3 Sheets-Sheet 2

INVENTOR
RUDOLF STADELMANN

Feb. 19, 1952 R. STADELMANN 2,586,107
INFINITELY VARIABLE-GEAR FOR DRIVING GUN MOUNTS
Filed July 6, 1949 3 Sheets-Sheet 3

INVENTOR
RUDOLF STADELMANN

Patented Feb. 19, 1952

2,586,107

UNITED STATES PATENT OFFICE 2,586,107

INFINITELY VARIABLE-GEAR FOR DRIVING GUN MOUNTS

Rudolf Stadelmann, Zurich, Switzerland, assignor to Machine Tool Works Oerlikon, Administration Company, Zurich-Oerlikon, Switzerland, a company of Switzerland Application July 6, 1949, Serial No. 103,186
In Switzerland July 12, 1948

7 Claims. (Cl. 74—690)

1

The present invention relates to an infinitely variable gear device for driving gun-mounts which permits of an infinitely variable drive with control forces of slight magnitude.

Infinitely variable gears for driving gun-mounts are already known in which the variable speed of drive is achieved by supplying to a differential gear a constant rotary speed from a drive motor and a control movement produced in a speed variator. The drawback of this known arrangement resides in the fact that, to produce the control movement, i. e., the variable rotary speed to be supplied to the differential gear, a substantial expenditure of power is required. In these known gears the entire turning moment is transmitted by the variable speed gear, the result of this being that these types of drive are extremely heavy and bulky and can therefore be used only for heavy gun-mounts and for guns of large calibre. In every case, these infinitely variable gears necessitate an extremely large source of power, so that for this reason alone their use with lighter gun-mounts would be uneconomical. Finally, there is the further fact that, owing to the large bulk of these gears, separate drives with separate sources of power become necessary for the movement in train and in elevation respectively. The purpose of the present invention is, as stated, to provide a gear device which is extremely simple in its structural design, occupies little space and consumes but little power in producing the variable speed to be supplied to the differential gear. A further purpose of the invention is to provide means whereby both the elevation and the train gear may be driven from a single power unit.

The infinitely variable gear device for driving gun-mounts, which gear device exhibits in the known manner a differential to which both a constant rotary speed and a variable rotary speed serving for control purposes are supplied and in which the variable speed is produced in a variable speed gear (speed variator), is characterized by the fact that between the variable speed gear and the differential a multi-part coupling is provided which has two parts driven at constant but mutually differing speeds and a part driven at the speed of the variator, the last-named part being fitted by means of a control screw-thread to the shaft which transmits the speed of the variator and driving a variable portion of the differential via helical-tooth spur gear the helical design of whose teeth produces the necessary bearing pressure of the clutches. The arrangement is such that the part of the coupling which transmits the variable speed couples, according to the speed to be transmitted and to the turning moment to be supplied to the differential, more with the faster or more with the slower of the outer parts, driven at constant speed, of the clutch.

The annexed drawing illustrates in Figs. 1 to 6 a typical embodiment of the invention, in which drawing Fig. 1 is a diagrammatic view in elevation of a mounted gun;

Figure 1:
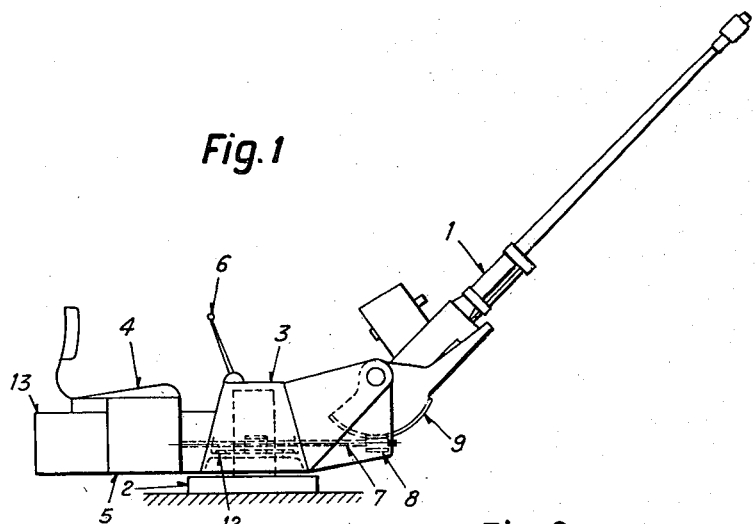
Figure 2:
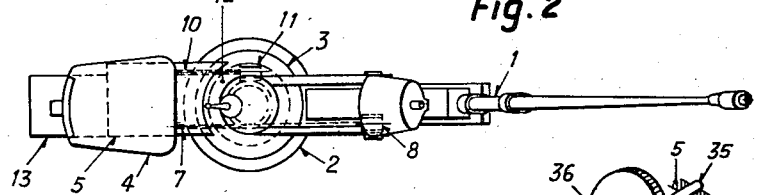
Fig. 2 is a view in plan of the gun to Fig. 1.

In Fig. 1, 1 is the gun which is mounted in a gun-mount 3 rotatably arranged on a base 2. Under the seat 4 of the gunner is arranged the gearbox 5 for the movement of the gun in train and in elevation. The movements in train and in elevation are controlled by the control lever 6. The shaft 7 emerging from the gearbox 5 drives, via worm 8, the worm-wheel segment 9 to move the gun in elevation. The further shaft 10 emerging from the gearbox 5 actuates, via the worm 11, a worm-wheel 12 to move the gun in train. 13 is the drive motor.

Figure 3:
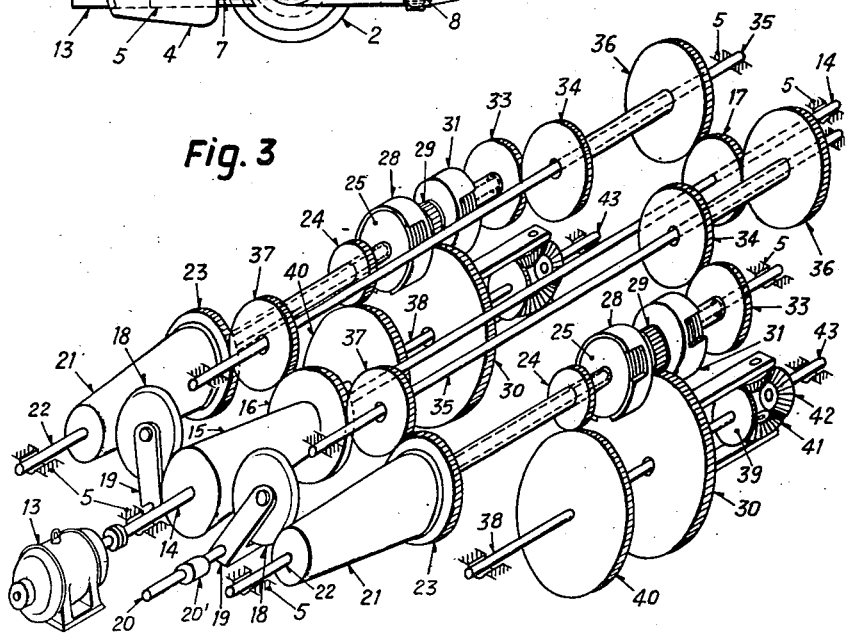
Fig. 3 is a perspective diagrammatic view of the infinitely variable gear device.
Figure 4:
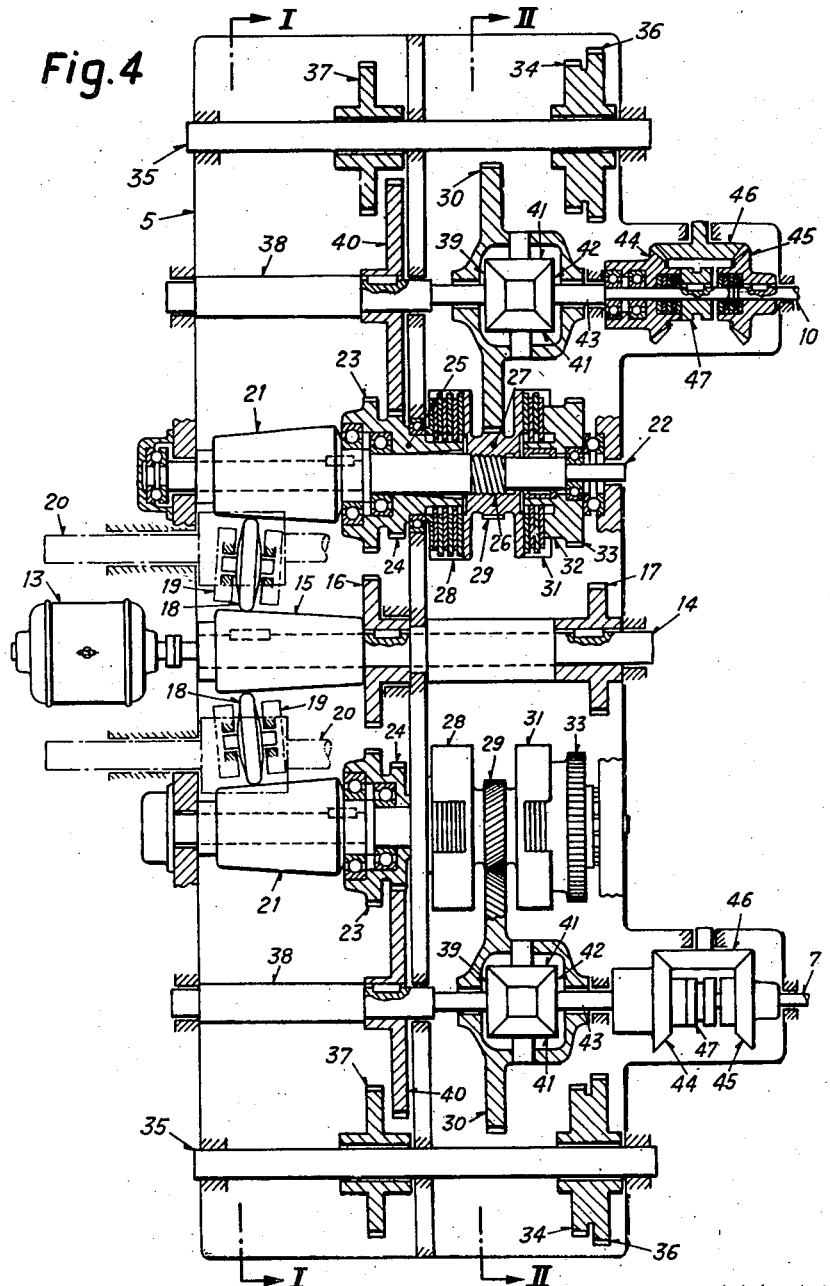
Fig. 4 is a section through the gear device reduced to one plane.
Figure 5:
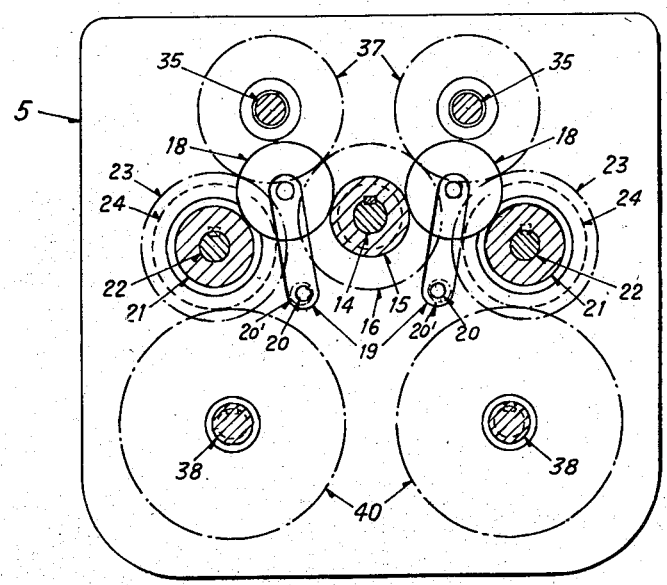
Fig. 5 is a section along the line I—I in Fig. 4.
Figure 6:
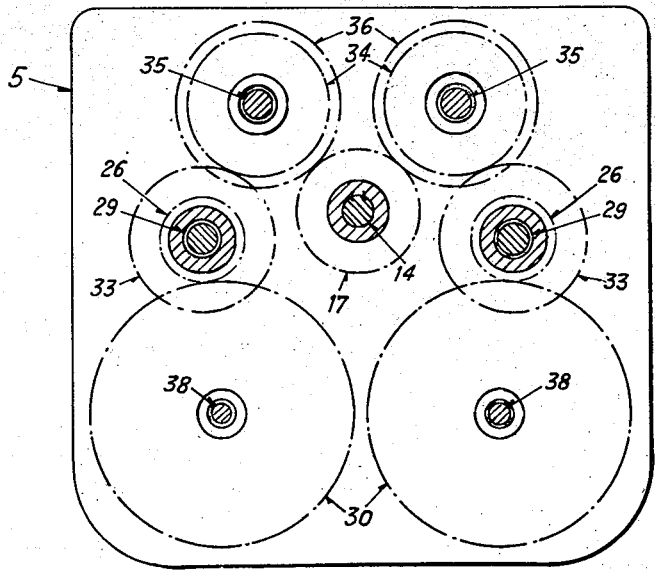
Fig. 6 is a section along the line II—II in Fig. 4.

Fig. 3 is a perspective view of the gear device in diagrammatic form, in which, as also in Figs. 5 and 6, the engagement of the gearwheels is shown, whilst Fig. 4 shows the gear device in section reduced to one plane. The power unit may for instance be an electric motor 13, or of course any other source of power. The motor 13 drives a shaft 14 mounted in the gearbox 5 not shown in Fig. 3. Arranged one behind the other on the shaft 14 and rigidly keyed thereto are the cone 15, the spur gear 16 and the spur gear 17. The connecting or transmission roller 18, mounted in a fork 19, bears against the cone 15. Fork 19 is mounted on the spindle 20 which is in turn so mounted in the gearbox 5 as to be axially displaceable. The connecting or transmission roller 18 also runs on a cone 21 rigidly keyed to the shaft 22 mounted in the gearbox 5. So mounted on shaft 22 as to be freely rotatable are the spur gear 23, the spur gear 24 and the inner part 25 of the clutch, said inner part carrying a portion of the pack of plates. In Fig. 3, spur gear 23 and 24 and part 25 of the clutch are shown as separate units, but, as may be seen from Fig. 4, these three parts 23—25 may also be made integral. The shaft 22 is provided with a control screw-thread 26 which fits into a corresponding screw-thread in the part 27 of the clutch driven at a variable speed. Said output portion 27 of the clutch is provided with a part 28 bearing plates engaging between the plates of part 25 of the clutch. Also provided is a toothed rim 29 engaging with spur gear 30. By means of a part 31 of similar design to part 28 and likewise carrying plates, the output portion 27 of the clutch engages with a likewise driven part 32 of the clutch. Part 32 of the clutch is, in turn, so mounted on shaft 22 as to be freely movable. Said part 32 of the clutch is provided with teeth 33 with which engages spur gear 34, the latter being so mounted on shaft 35 as to be freely movable. As may be seen from Fig. 4, spur gear 34 is coupled to a spur gear 36 which engages with spur gear 17. Mounted so as to be freely mobile on the spindle 35 rigidly fitted in the gearbox 5 is, further, the spur gear 37, which meshes on the one hand with the spur gear 16 and on the other with the spur gear 23.

Spur gear 30, which meshes with the teeth 29 in the output portion of the clutch, is so mounted on shaft 38 as to be freely mobile. The spur gear 30 constitutes, as Fig. 4 shows, the planet pinion carrier of the differential in which the sun gear 39 is fitted. The sun gear 39 is driven by the shaft 38, the latter being driven via spur gear 40, which meshes with spur gear 24. The planet pinions 41 are, in accordance with known practice in the construction of differential gears, mounted in the planet pinion carrier (spur gear 30). The output sun gear 42 is mounted on the output shaft 43 on which a reversing gear is also provided (see Fig. 4; not shown in Fig. 3), said reversing gear comprising, in accordance with known practice, the two bevel gears 44 and 45 and a bevel gear 46 arranged therebetween. An engageable and disengageable plate clutch 47, by the operation of which the shaft 7 or 10 is either coupled direct to shaft 43 or coupled indirectly thereto via bevel gears 44, 46 and 45, is provided between bevel gears 44 and 45.

The operation of the gears described and illustrated is as follows:

The power unit 13 (internal combustion engine, electric motor, compressed-air motor or the like) drives a mainshaft 14, which turns at a speed of for example 3000 R. P. M. The spur gear 16 rigidly mounted on the mainshaft 14 drives, via the spur gear 37 rotatably mounted on the intermediate gearshaft 35, the pair of spur gears 23 and 24, designed as the primary side of the driving half of the clutch. The transmission ratio between spur gear 16 and the spur gears 23 and 24, the latter being made integral, is 1:1, i. e., this primary side likewise exhibits a speed of $n=3000$ R. P. M. Spur gear 24 drives spur gear 40 of the differential drive shaft 38 with a transmission ratio of 1:2. The spur gear 17 rigidly mounted on the mainshaft 14 drives, via the intermediate gears 36 and 34 rotatably mounted on the intermediate gearshaft 35, the spur gear 33, which is designed as portion 32 of the clutch, with a transmission ratio of for example $n=3:4$, so that clutch part 32 assumes a speed of 2250 R. P. M. Clutch parts 28 and 31 are incorporated as a single unit, namely, the spur gear 29, which is designed as a nut axially displaceable on the screw thread 26. The clutches can, as shown by way of example in the drawing (Fig. 4), be designed as plate clutches, L. Clutch body 27 must assume the speed of shaft 22, otherwise the screw-thread 26 will, if said body 27 lags behind, move same towards the ($n=3000$ R. P. M.) side of the clutch and, if said body 27 forges ahead, move same towards the $n=2250$ R. P. M.) side of the clutch bringing it into contact until it has assumed the speed of shaft 22. The necessary bearing pressure of the clutches is produced by the helical toothing of the spure gears 29 and 30. Said helical toothing is such that the axial component produced by the tangential or peripheral force supplies the necessary bearing pressure. Shaft 22 is therefore called upon to transmit a small control force only, and screw-thread 26 is not self-locking, so that no seizing can take place in the event of sudden changes in rotary speed, as for example when decelerating.

Cone 21 is driven by the cone 15 mounted on the mainshaft 14 via a friction roller 18 which is mounted in a fork 19 supported on a rotatable spindle 20, the speed of cone 21 being variable within the range of for example 2250 and 3000 R. P. M. The spur gear 29 will adjust itself to this speed. The speed range of the spur gear 30 engaging with spur gear 29 will, in accordance with the ratio of 1:3 quoted by way of example, lie between 750 and 1000 R. P. M. If, therefore, the sun gear 39 driven through shaft 38 by spur gear 40 rotates at a speed of $n=1500$ R. P. M. and the spur gear 30 rotates at $n=750$ R. P. M., the rotating planet pinions 41 will revolve upon each other in such a way that output sun gear 42 will remain motionless. At a speed of $n=1500$ R. P. M. of the sun gear 39 and $n=1000$ R. P. M. of the spur gear 30 carrying the planet pinions 41, a speed of $n=500$ R. P. M. will result in the output sun gear 42. Thus it is possible to vary the speed of the output sun gear 42 from nil to $+500$ R. P. M.

Reversal of the direction of rotation is achieved by a reversing gear located outside the gearbox 5. A middle clutch sleeve 47 of a double clutch, which sleeve is axially displaceable on the shaft 43 rigidly connected to output sun gear 42, and which double clutch is radially connected to shaft 43 by a key, is brought into engagement to one side or the other as may be desired. If, for instance, the clutch sleeve 47 is engaged towards the side of the pack of plates of bevel gear 44, the turning moment is transmitted via the bevel gears 44, 46 and 45, and the output shaft 7 or 10 will then assume a direction of rotation contrary to that of shaft 43. If clutch sleeve 47 is engaged in the direction of the pack of plates of bevel gear 45, the turning movement will be transmitted direct, i. e., the direction of rotation of output shaft 7 or 10 will be the same as that of shaft 43. It would also be possible to achieve the alteration in the direction of rotation by suitable selection of the range of regulation, but in this case the maximum losses resulting from the turning moment multiplied by the maximum difference in rotary speed would be correspondingly greater. By the reversing gear described, the losses can by simple means be reduced to half. These losses are less, for example, than those occurring with hydraulic drives.

Since the centre of rotation of friction roller 18, when said roller is displaced, must likewise be displaced in accordance with the taper of cones 15 and 21, said friction roller 18 is mounted in a fork 19 so mounted as to pivot about the centre of rotation of spindle 20. To enable friction roller 18 to be adjusted to the necessary bearing pressure, the spindle 20 is mounted in adjustable eccentric bushes 20'.

The gears are branched off, from mainshaft 14, to two sides for the movement in elevation and the movement in train respectively, and the two output shafts 7 and 10 respectively drive, for example, the worm wheels 9 and 12 for movement in elevation and movement in train respectively.

Needless to say, instead of the friction wheel gear, other types of variators, such as hydraulic, electric, pneumatic or mechanical gears may be used. The plate clutches may be replaced by other clutches of known design.

I claim:

1. An infinitely variable gear for driving gunmounts, comprising a driving shaft, a speed variator operatively connected with said driving shaft, a multi-part clutch comprising three clutch parts, means connecting the first and second of said three clutch parts with said driving shaft for driving them at constant but mutually differing speeds, a shaft connected with said speed variator and driven thereby, said shaft having a threaded portion, the third clutch part being mounted upon said threaded portion, and being actuated by said speed variator to couple with either the first clutch part or the second clutch part, a helical gearing connected with said third clutch part and driven thereby, a differential having a planetary pinion connected with said helical gearing and driven thereby and a sun gear meshing with said planetary pinion; means connecting said driving shaft with said sun gear for driving the latter with a constant speed, an output shaft, and means connecting said output shaft with said differential.

2. An infinitely variable gear for driving gunmounts as claimed in claim 1, characterized by the fact that the speed variator consists of two taper rollers and a transmission roller interconnecting said taper rollers.

3. An infinitely variable gear for driving gunmounts as claimed in claim 1, characterized by the fact that the clutch is a plate clutch.

4. An infinitely variable gear for driving gunmounts as claimed in claim 1, characterized by the fact that said threaded portion is not self-locking.

5. An infinitely variable gear for driving gunmounts as claimed in claim 1, characterized by the fact that the helical toothing of said helical gearing is not self-locking.

6. An infinitely variable gear for driving gunmounts as claimed in claim 1, characterized by the fact that the transmission ratios of the gears are so selected that the output shaft emerging from the differential rotates in one direction only between zero and maximum speeds and that a reversing gear is provided for reversing the direction of rotation up to the maximum speed in the other direction of rotation.

7. An infinitely variable gear for driving gunmounts as claimed in claim 1, characterized by the fact that a single source of power is provided for driving the elevating and training gears.

RUDOLF STADELMANN.

REFERENCES CITED

The following references are of record in the file of this patent:

UNITED STATES PATENTS

| Number | Name | Date |
| --- | --- | --- |
| 2,178,859 | Jett | Nov. 7, 1939 |
| 2,216,190 | Erban | Oct. 1, 1940 |
| 2,404,907 | Heynau | July 30, 1946 |